US012738293B2

(12) United States Patent
Ren et al.

(10) Patent No.: US 12,738,293 B2
(45) Date of Patent: Sep. 15, 2026

(54) WRITER WITH PATTERNED HOT SEED LAYER

(71) Applicant: Headway Technologies, Inc., Milpitas, CA (US)

(72) Inventors: Haowen Ren, Fremont, CA (US); Weihao Xu, San Jose, CA (US); Yuxuan Xiao, Milpitas, CA (US); Shehrin Sayed, Fremont, CA (US); Yue Liu, Fremont, CA (US); Yan Wu, Cupertino, CA (US); Yuhui Tang, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 18/369,786

(22) Filed: Sep. 18, 2023

(65) Prior Publication Data

US 2025/0095672 A1 Mar. 20, 2025

(51) Int. Cl.
*G11B 5/23* (2006.01)

(52) U.S. Cl.
CPC .................................... *G11B 5/23* (2013.01)

(58) Field of Classification Search
None
See application file for complete search history.

(56) References Cited

U.S. PATENT DOCUMENTS

| | | | | |
|---|---|---|---|---|
| 9,299,367 | B1 * | 3/2016 | Tang | G11B 5/315 |
| 9,508,364 | B1 * | 11/2016 | Tang | G11B 5/313 |
| 9,653,101 | B1 * | 5/2017 | Liu | G11B 5/235 |
| 10,339,964 | B1 * | 7/2019 | Liu | G11B 5/11 |
| 10,770,103 | B1 * | 9/2020 | Liu | G11B 5/6082 |
| 10,997,989 | B1 * | 5/2021 | Asif Bashir | G11B 5/3153 |
| 2021/0056987 | A1 * | 2/2021 | Wu | G11B 5/3146 |
| 2023/0083836 | A1 * | 3/2023 | Liu | G11B 5/315 360/125.3 |

* cited by examiner

*Primary Examiner* — William J Klimowicz
(74) *Attorney, Agent, or Firm* — DLA Piper LLP (US)

(57) ABSTRACT

The present embodiments relate to a write head design with a patterned hot seed (HS). Particularly, the HS can be patterned as part of a multi-step patterning process that can partially or completely remove portions of the HS at multiple sides to form various designs. For example, the HS can have a two-step cliff design, etching multiple steps around an un-patterned center portion, and a flared angle. The designs of the patterned HS can improve write head performance.

19 Claims, 13 Drawing Sheets

| Folder Name | HS_P_DISH_t (nm) | HS_P_DISH_w (nm) |
|---|---|---|
| Design0001 | 0 | 360 |
| Design0002 | 50 | 150 |
| Design0003 | 80 | 80 |

WRITER WITH PATTERNED HOT SEED LAYER

TECHNICAL FIELD

Embodiments of the invention relate to the field of electro-mechanical data storage devices. More particularly, embodiments of the invention relate to a write head for a disk drive that includes a patterned hot seed layer.

BACKGROUND

A magnetic recording medium (e.g., a magnetic disk) can store magnetic bits representing digital data. A magneto-resistive writer can be part of a hard disk drive (HDD) to write digital data to the magnetic recording medium.

As an overall amount of digital data being stored on HDD devices increases, there is an increasing demand for increased data capacity of HDD devices. One technique to increase data capacity for an HDD can include perpendicular magnetic recording (PMR), microwave-assisted magnetic recording (MAMR), and heat-assisted magnetic recording (HAMR). HAMR techniques increase the density of HDDs by applying heat to a portion of the magnetic recording medium, which can enhance write performance of the write head to the magnetic recording medium.

SUMMARY

The present embodiments relate to a write head design with a patterned hot seed (HS). Particularly, the HS can be patterned as part of a multi-step patterning process that can partially or completely remove portions of the HS at multiple sides to form various designs. For example, the HS can have a two-step cliff design, etching multiple steps around an un-patterned center portion, and a flared angle. The designs of the patterned HS can improve write head performance.

In a first example embodiment, a write head for a disk drive is provided. The write head can include a main pole (MP), a trailing shield (TS), and a write gap (WG) between the MP and TS. The write head can also include a hot seed (HS) deposited on top of the WG and extending into an air-bearing surface of the write head. The HS can be patterned to comprise one or more steps and a flared end disposed at a flared angle relative to the ABS.

In some instances, the HS is patterned to include a discrete two-step cliff design that includes two steps etched between a central portion, wherein the steps are etched to an etching depth.

In some instances, a thickness of the HS is between 40-200 nanometers (nm) and a width of the HS is between 50-400 nm, and wherein the flared angle is between 20-50 degrees relative to the ABS.

In some instances, the HS is patterned using an etching process or between a multiple step process including performing multiple etching steps on top of each layer of the HS.

In some instances, the etching depth is between 1 nm to 100 nm, and wherein a width of the center portion is between 50 nm to 400 nm.

In some instances, the center portion extends to the ABS, and wherein the center portion comprises an angle between 0 degrees to 70 degrees relative to the ABS. In some instances, part of the center portion adjacent to the ABS is etched, wherein the etching distance of the part of the center portion is between 1 nm and 300 nm. In some instances, a remaining part of the centered portion is a curve in an oval or circular shape, or includes a flared angle ranging from 0 degrees to 70 degrees.

In some instances, wherein the HS includes a first part and a second part, wherein a first part is disposed adjacent to the WG and is narrower than the second part. Further, a dishing angle can be formed between the first part and second part with the dishing angle being between 20 degrees and 150 degrees, and wherein a thickness of the first part is between 1 nm to 100 nm.

In another example embodiment, a device provided. The device can include a main pole (MP) configured to concentrate a magnetic flux, a trailing shield (TS), and a write gap (WG) between the MP and TS, the WG comprising a non-magnetic material. The device can also include a side shield, leading shield, and a write shield disposed adjacent to the MP and configured to prevent magnetic flux from reaching areas outside of a desired area. The device can also include a hot seed (HS) deposited on the WG and extending into an air-bearing surface of the write head. The HS can be patterned to comprise one or more steps and a flared end disposed at a flared angle relative to the ABS.

In some instances, the HS is patterned to include a discrete two-step cliff design that includes two steps etched between a central portion, wherein the steps are etched to an etching depth.

In some instances, a thickness of the HS is between 40-200 nanometers (nm) and a width of the HS is between 50-400 nm, and wherein the flared angle is between 20-50 degrees relative to the ABS.

In some instances, the HS is patterned using an etching process or between a multiple step process including performing multiple etching steps on top of each layer of the HS.

In some instances, the etching depth is between 1 nm to 100 nm, and wherein a width of the center portion is between 50 nm to 400 nm.

In some instances, the center portion extends to the ABS, and wherein the center portion comprises an angle between 0 degrees to 70 degrees relative to the ABS. In some instances, part of the center portion adjacent to the ABS is etched, wherein the etching distance of the part of the center portion is between 1 nm and 300 nm. In some instances, a remaining part of the centered portion is a curve in an oval or circular shape, or includes a flared angle ranging from 0 degrees to 70 degrees.

In some instances, the HS includes a first part and a second part, wherein a first part is disposed adjacent to the WG and is narrower than the second part, wherein a dishing angle is formed between the first part and second part with the dishing angle being between 20 degrees and 150 degrees, and wherein a thickness of the first part is between 1 nm to 100 nm.

In another example embodiment, a write head is described. The write head can include a main pole (MP), a trailing shield (TS), a write gap (WG) between the MP and TS and a hot seed (HS) deposited on top of the WG and extending into an air-bearing surface of the write head. The HS can be patterned to include a discrete two-step cliff design that includes two steps etched between a central portion, wherein the steps are etched to an etching depth.

In some instances, the etching depth is between 1 nm to 100 nm, and wherein a width of the center portion is between 50 nm to 400 nm.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figures 1A, 1B:
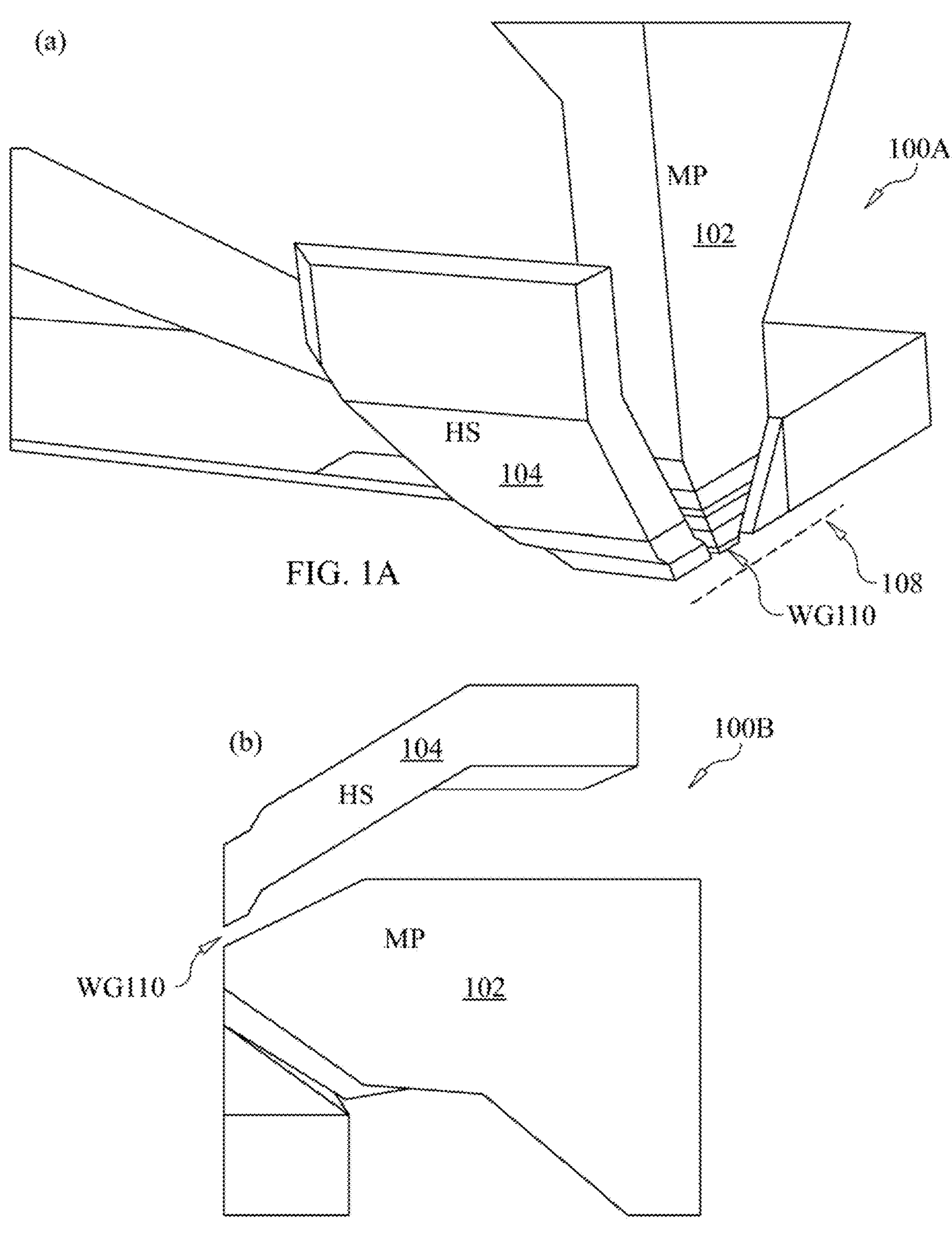
FIGS. 1A-1D illustrate views of a write head and its written pattern in media according to an embodiment.
Figure 1C:
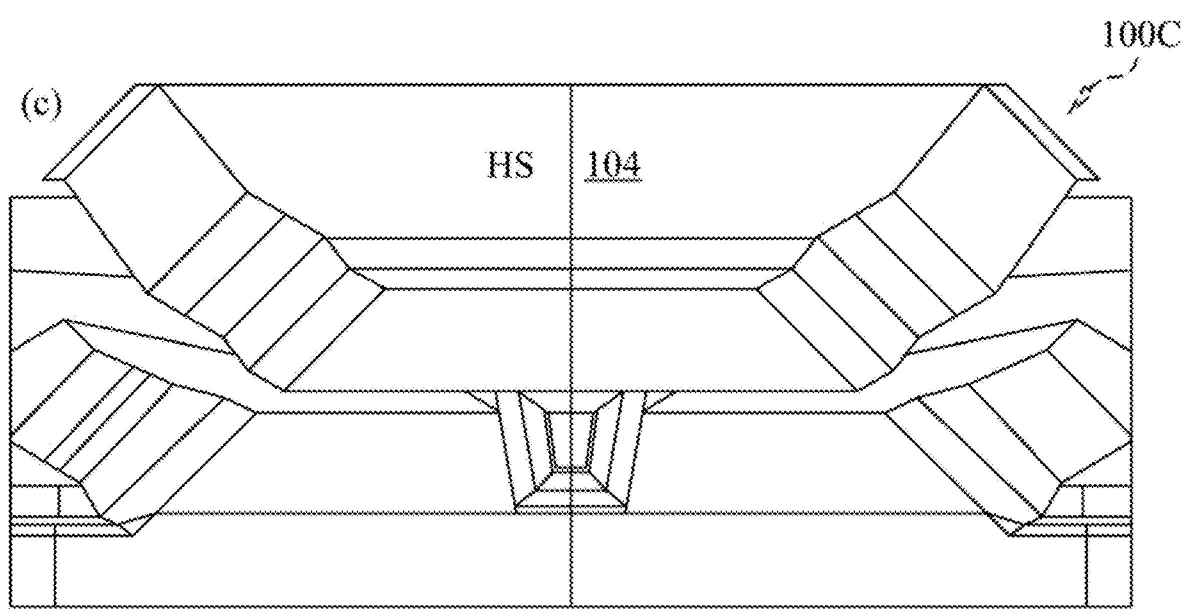
Figure 1D:
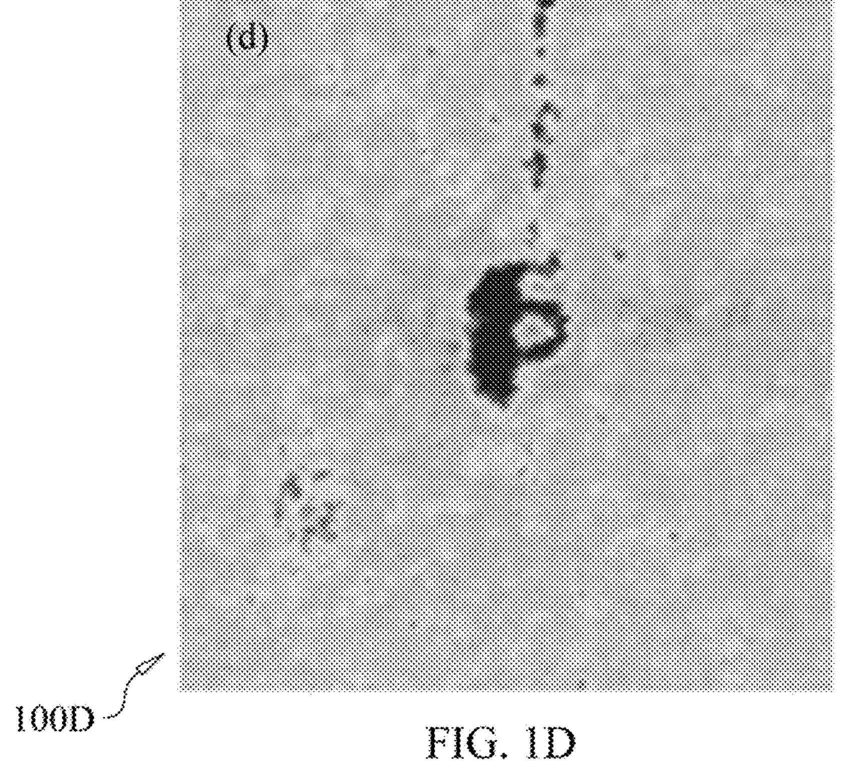

A disk drive can include a write head to interact with a magnetic recording medium to read and write digital data to the magnetic recording medium. As the amount of digital data is required to be stored increases and with an increase in data aerial density of hard disk drive (HDD) writing, both the write head and digital data written to the magnetic recording medium can be made smaller.

The HDD industry has been a crucial part in the digital revolution, providing a storage technology for personal computers, servers, and data centers for several decades. With the exponential growth in data generation worldwide, the HDD industry can be used to address the massive demand for data storage. The growth rate of data generation from the world has been exponential in recent years, driven by the widespread use of digital devices, the internet, and cloud computing. According to recent studies, the amount of data generated worldwide is expected to reach 180 zettabytes (ZB) by 2025, up from 33 ZB in 2018.

This unprecedented growth in data generation has created a massive demand for data storage, which the HDD industry is well-positioned to address. The development of new magnetic recording technologies, such as perpendicular magnetic recording (PMR), microwave-assisted magnetic recording (MAMR), and heat-assisted magnetic recording (HAMR), has enabled the industry to pack more data onto disk platters, leading to increased storage capacity and improved performance. As a result, the HDD industry is poised to continue providing reliable and cost-effective storage solutions to meet the growing demand for data storage, despite the competition from other storage technologies.

To achieve higher area density capacity (ADC), a trailing shield (TS) can be used to further increase the down track (DT) gradient, which can assist the increase of bit per inch (BPI). In addition to that, to concentrate more magnetic flux near the writer gap, high moment materials can be deposited near the writer gap as hot seed (HS), further pushed up the BPI.

Further, the size of writer can be scaled down, especially the size of the main pole (MP), which may only have approximately 30-40 nm width near the writer gap (WG). However, as the increase of track per inch (TPI), the erasure width (EW) can approach the same level as the width of MP at air bearing surface (ABS), mismatching with the size of the HS. Consequently, the HS can become a major contributor to the adjacent track interference (ATI), hindering the improvement of PMR's ADC.

In many cases, a head design can be composed of a thin layer of high moment magnetic material deposited on top of WG. FIGS. 1A-1D illustrates (a) 3-dimentional view of the current HS design 100A, (b) cross-sectional view of the HS and MP 100B, (c) ABS (108) view of the HS 100C, and a (d) footprint map 100D as an opposite magnetic field can be applied on a static head and approach to a media with a DC background. As shown in FIGS. 1A-1D, the write head can include a main pole (MP) 102 and a hot seed (HS) 104.

Typically, the HS width can be around 300-400 nm, while the MP width can be below 50 nm. The HS can shield the magnetic flux emitted from the MP and increase the down-track (DT) gradient to enable higher BPI during the writing process. However, since most of the return field can be concentrated in the HS area and the width of HS is much wider than the MP width, it can result in a strong interference near the +1 and −1 tracks, which can significantly increase the ATI effect and reduce the TPI. This is supported by the footprint map (in FIG. 1D) that as the head writes in the opposite direction of magnetic field from a static head on a media with DC background, it can be observed that the field is concentrated on the HS region, which can extend way beyond the MP width.

To solve this strong interference issue from the HS when the MP is scaled down, a design on the HS can be incorporated, that by reducing the magnetic volume near the two sides of HS, can reduce the ATI at the adjacent tracks and potentially, improve the TPI. However, simply narrowing the HS width can come with the price of worse BPI due to worse DT gradient. To reduce the ATI and maintain the same level of DT gradient, the HS design may still partially keep the HS at two sides.

The present embodiments relate to a write head design with a patterned hot seed (HS). Particularly, the HS can be patterned as part of a multi-step patterning process that can partially or completely remove portions of the HS at multiple sides to form various designs. For example, the HS can have a two-step cliff design, etching multiple steps around an un-patterned center portion, and a flared angle. The designs of the patterned HS can improve write head performance.

Example Design 1

Figure 2A:
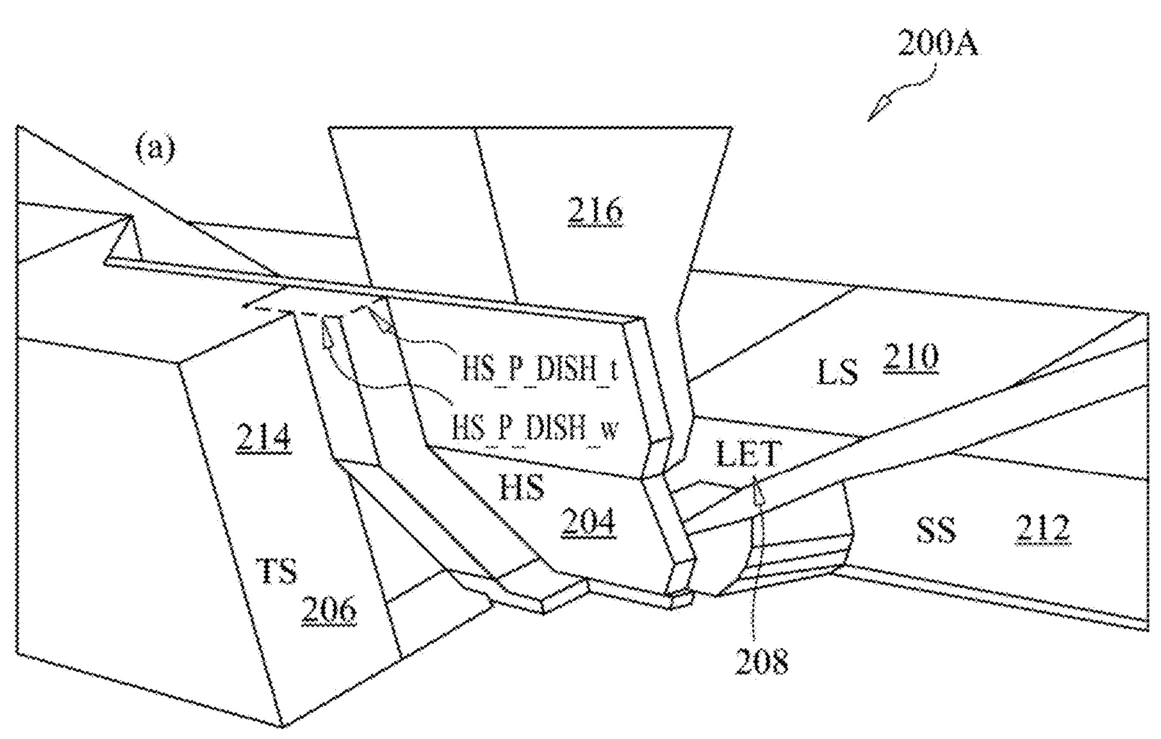
FIGS. 2A-2B illustrate a first patterned HS design according to an embodiment.
Figure 2A:
Figure 2B:
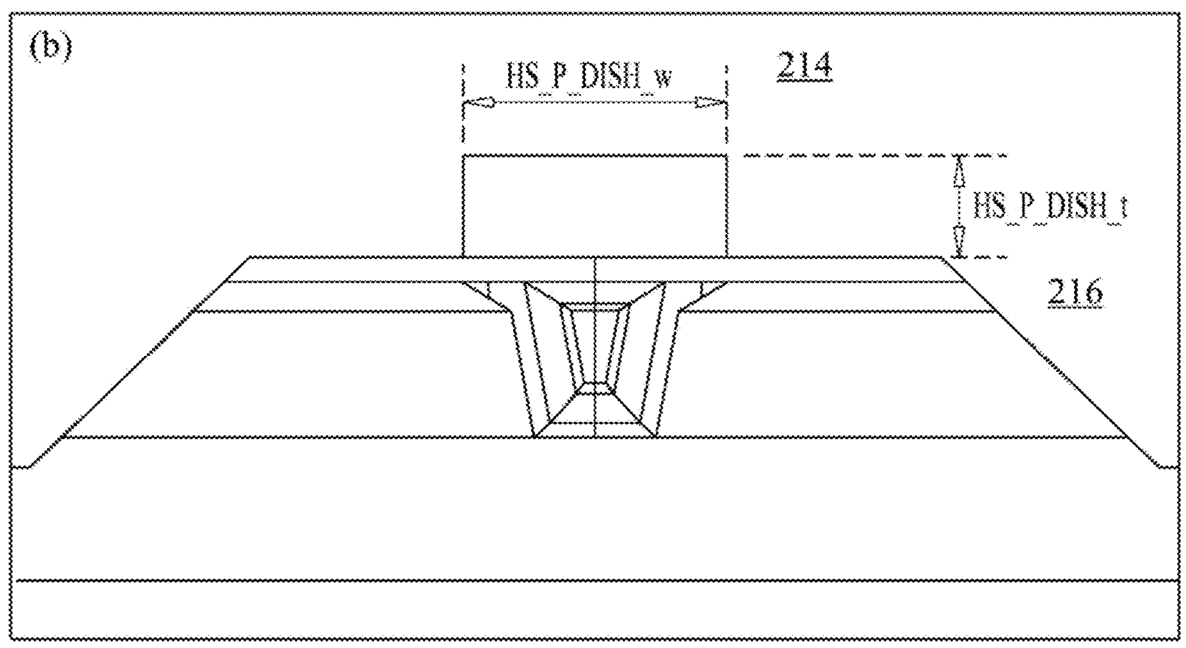

FIGS. 2A-2B illustrate a first patterned HS design. FIG. 2A illustrates a 3-D schematic drawing 200A and 2B illustrates ABS-view 200B of the HS design 1. Two variables HS dishing thickness HS_P_DISH_t 216 and HS dishing widths HS_P_DISH_w 214 can be shown in FIGS. 2A-2B. Further, the write head can include a HS 204, a trailing shield (TS) 206, a LET 208, a leading shield (LS) 210, a side shield (SS) 212.

In this design, two sides of the HS can be partially etched with various HS dishing thickness HS_P_DISH_t and HS dishing width HS_P_DISH_w. In this design, the remaining unetched HS part can extend straight up to the top of the HS, which can mean that the remaining HS has a constant width beyond the ABS plane. This can greatly reduce the magnetic volume at the two sides of the HS and subsequentially reduce the return field in these two regions.

Example Design 2

Figure 3A:
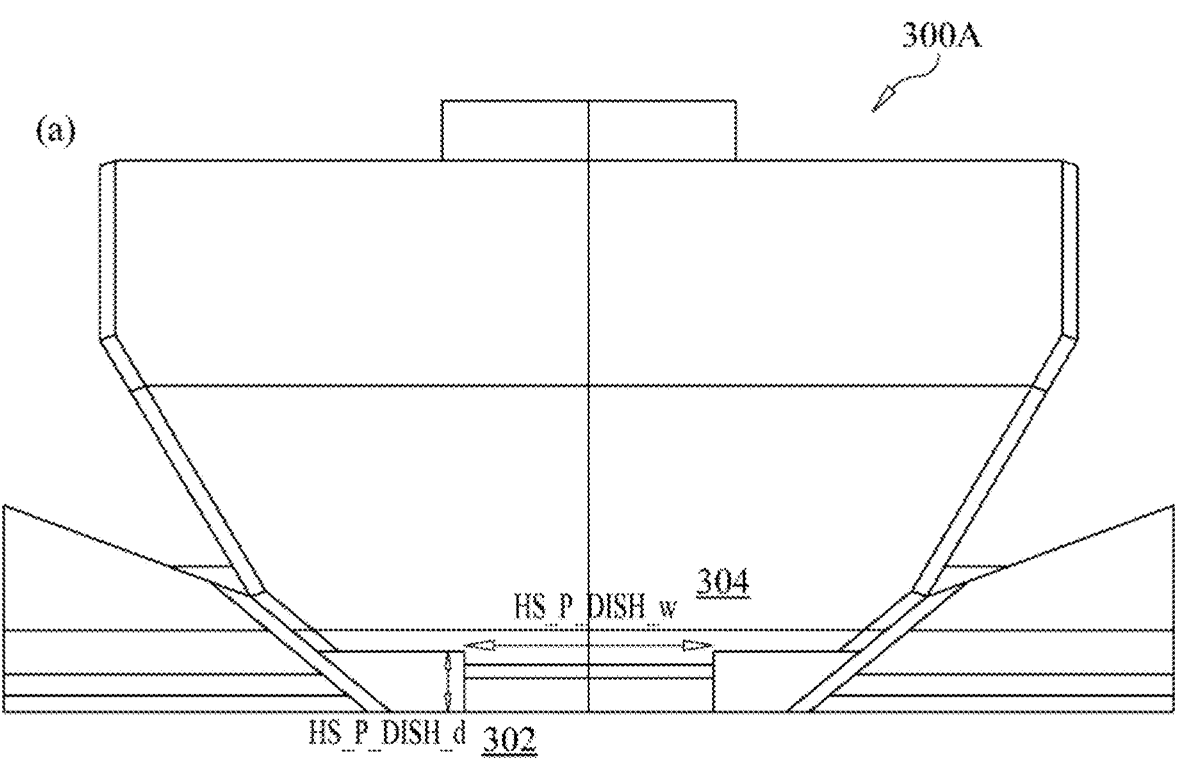
FIGS. 3A-3B illustrates views of a second HS design according to an embodiment.
Figure 3B:
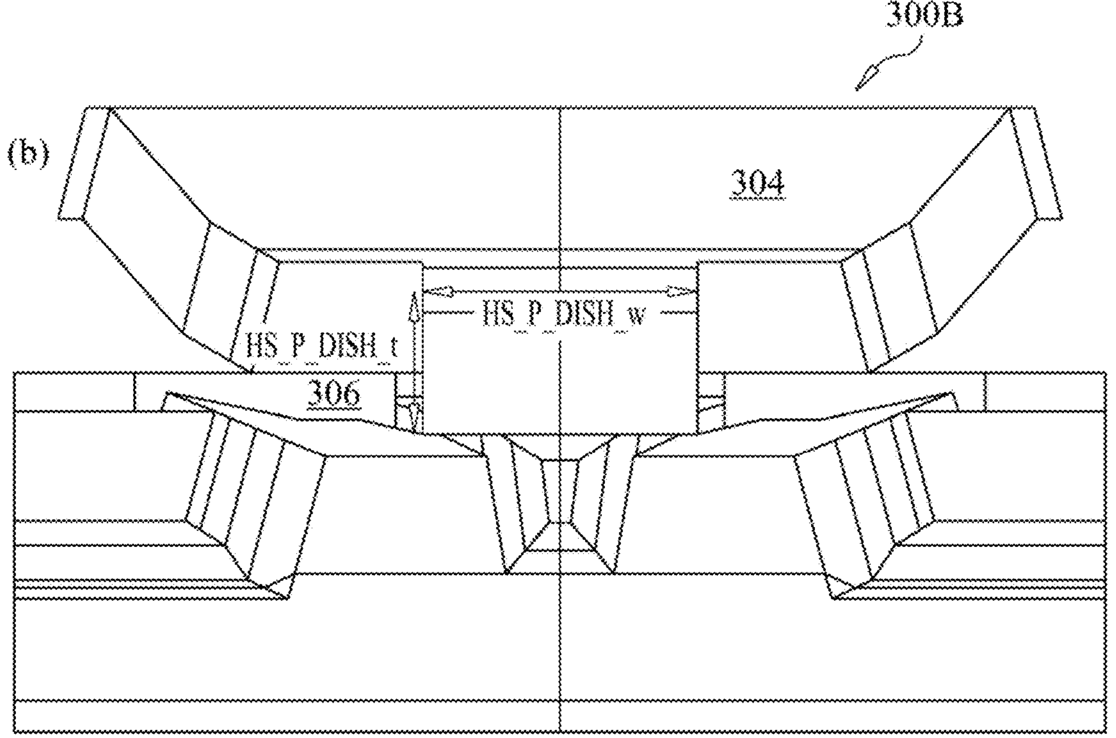

A second patterned HS design can include a complete etching the two sides of HS near the ABS, while keep the upper parts untouched, as shown in FIGS. 3A-3B. FIG. 3A illustrates a top view 300A and FIG. 3B illustrates an ABS-view 300B of the second HS Design. HS_P_DISH_t can be equal to the thickness of the HS in this design, and a HS_P_DISH_w 304 can be a width of the center portion of the HS.

In this etching strategy, a two-step photo and etching process can define the narrow HS near the ABS. The HS_P_DISH_t 306 can be equal to the thickness of the HS. The additional etching parameter HS_P_DISH_d 302 can include the pattern distance from the ABS. As a result, the return field at two sides of HS can be much weaker and concentrate in the center of HS.

Example Design 3

Figure 4A:
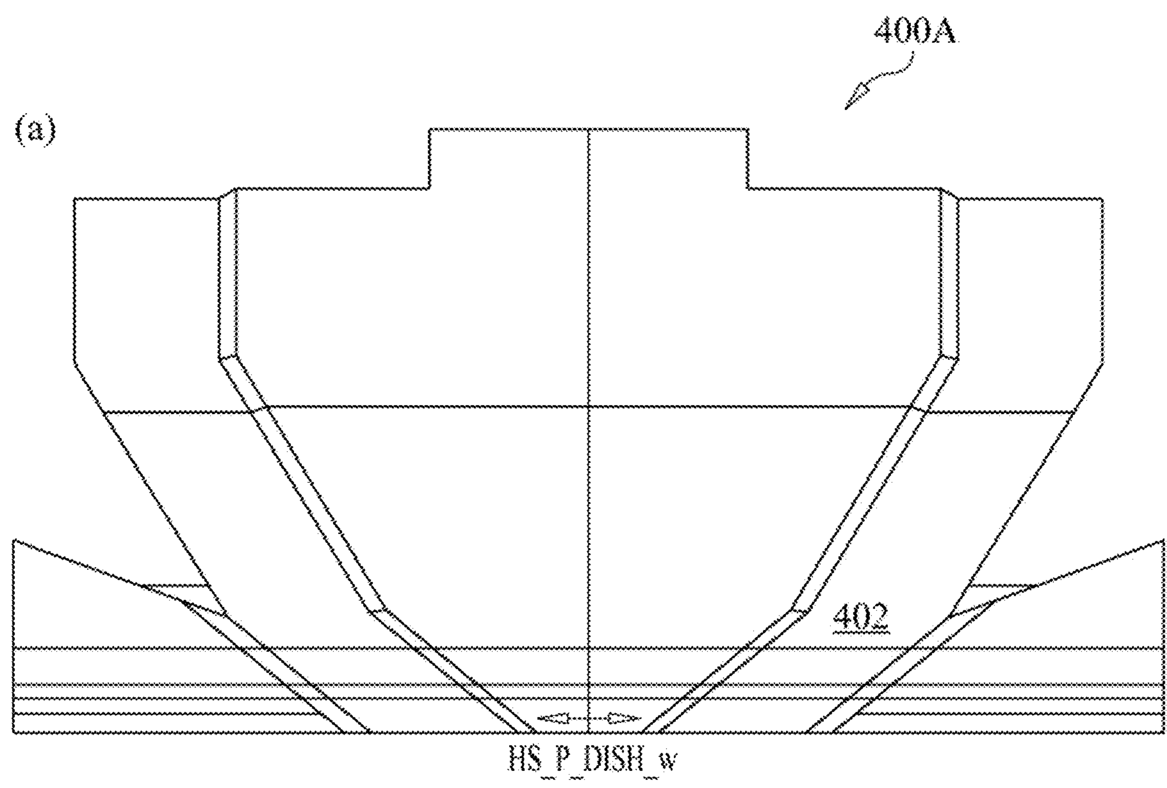
FIGS. 4A-4B illustrates views of the third patterned HS design according to an embodiment.
Figure 4B:
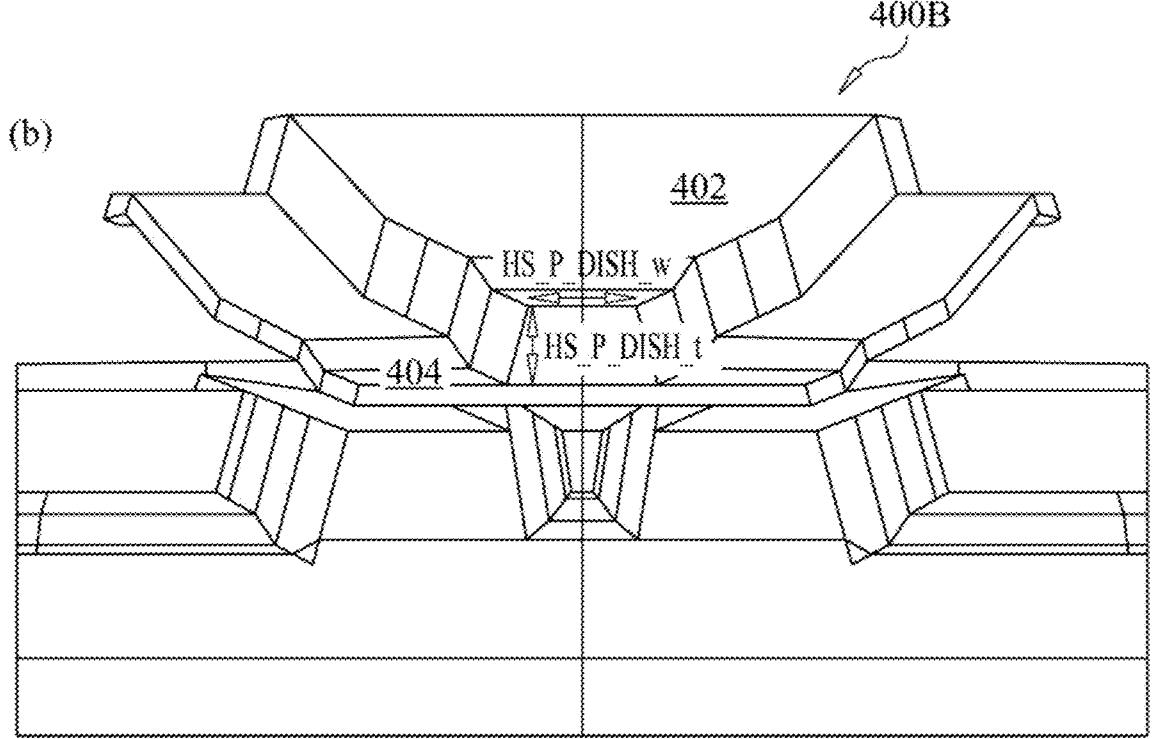

The third patterned HS design can follow similar etching strategy as the first example design, while the difference is that the top flare part can follow the shape of the original HS as shown in FIGS. 4A-4B. FIG. 4A illustrates a top-view 400A and FIG. 4B illustrates a ABS-view 400B of the third patterned HS design. HS_P_DISH_t can be smaller than the HS thickness in this design, while the flared part of remaining HS can follow the shape of original HS.

In this design, the HS_P_DISH_t 404 can be smaller than the thickness of the HS and the HS_P_DISH_w 402 can keep expanding with the increase of distance from the ABS plane. In this design, the HS can also greatly reduce the magnetic volume at the two sides and still maintain proper HS volume as a whole piece.

Example Design 4

Figure 5:
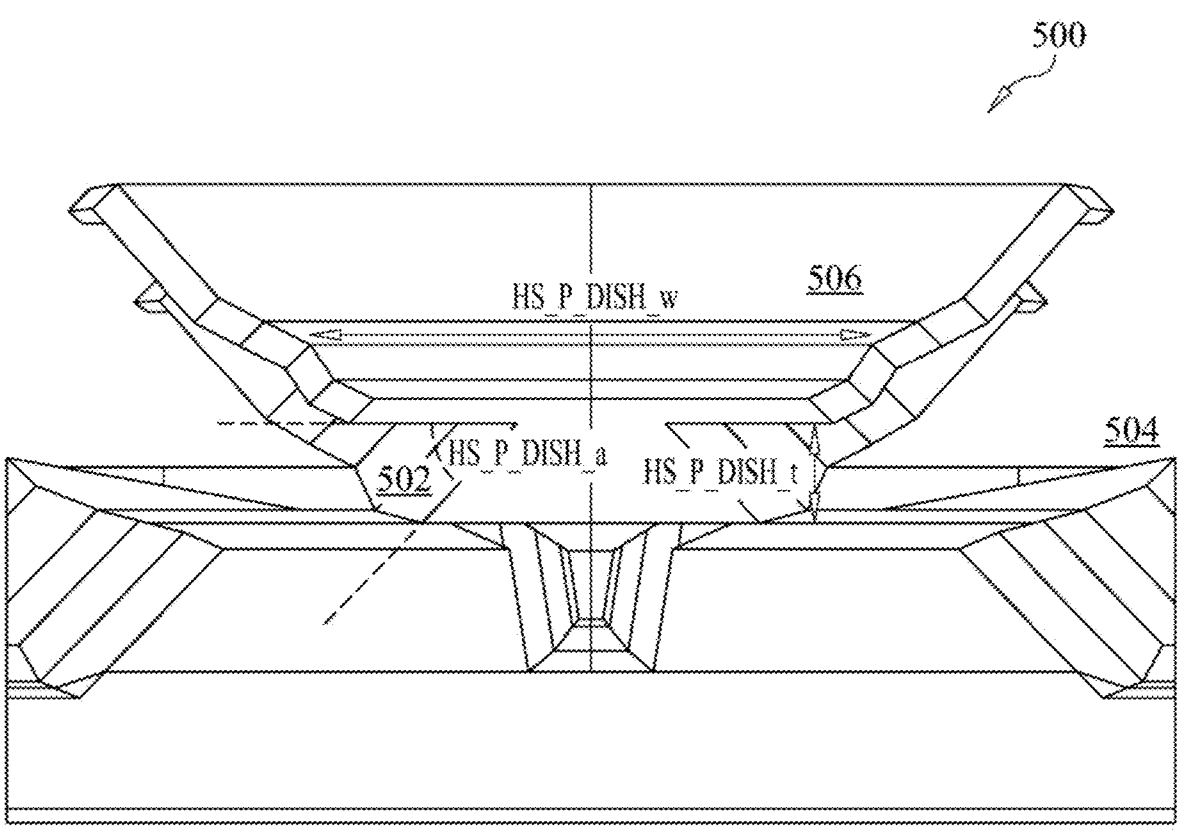
FIG. 5 illustrates a write head with a reversed HS design according to an embodiment.

The fourth patterned HS design can be similar to the third example design, but different in the position of the remaining side HS. FIG. 5 illustrates a write head 500 with a reversed HS design.

As shown in FIG. 5, the two sides of HS can be milled completely first, then a thin layer of wider HS can be deposited on top of the patterned HS. This design is a reversed HS design compared to designs 1-3. This design can also reduce the interference from the two sides of the HS and still maintain sufficient magnetic moment in HS as a whole. In FIG. 5, the head 500 can include a thickness HS_P_DISH_t 504, a HS_P_DISH_w 506, and an angle HS_P_DISH_a 502 between 504 and 506.

In many instances, a main difference between the patterned HS designs as described herein and other HS designs can include the shape of the magnetic materials at two sides of the HS. In other designs, the HS may only be patterned once and etched through the entire HS with a width around 400 nm. Compared to other designs, the patterned HS designs as described herein can carry out a two-step etching process, which can add an additional etching step on top of the first original etching step. The following additional etching step can be based on a smaller photo mask and it can either partially or completely remove the HS materials at two sides in different shape design as shown in three different designs.

To understand the effect of the patterned HS designs, static modeling based on Maxwell equations and dynamic modeling based on the Landau-Lifshitz-Gilbert (LLG) equations can be carried out. The models can be built in Vector Field software and meshed in finite element method (FEM). For the static modeling, information can be extracted when the magnetic head is saturated. For the dynamic part, the head can be driven in high frequency and examinate the domain's motion at the ABS. In both cases, the field boxes can be set at 15 nm below the ABS plane as an approximation to the field profiles generated from the writer head. A typical field profile can be plotted in FIG. 6A, where black line picked up the 5000 Oersteds (Oe) contour line.

Figure 6A:
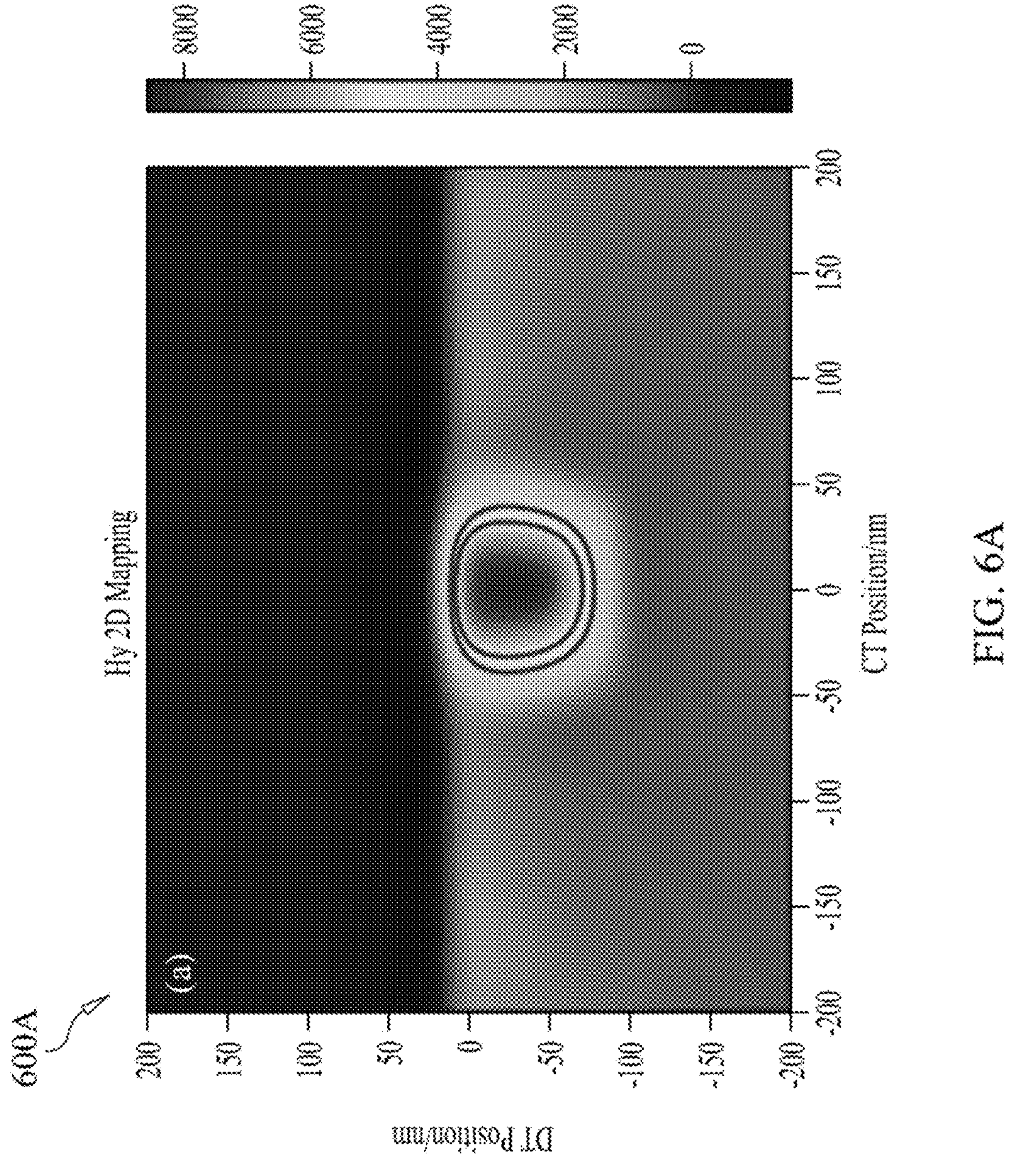
FIGS. 6A-6D provides illustrates of various static simulations and parameters of the patterned HS designs according to an embodiment.
Figure 6B:
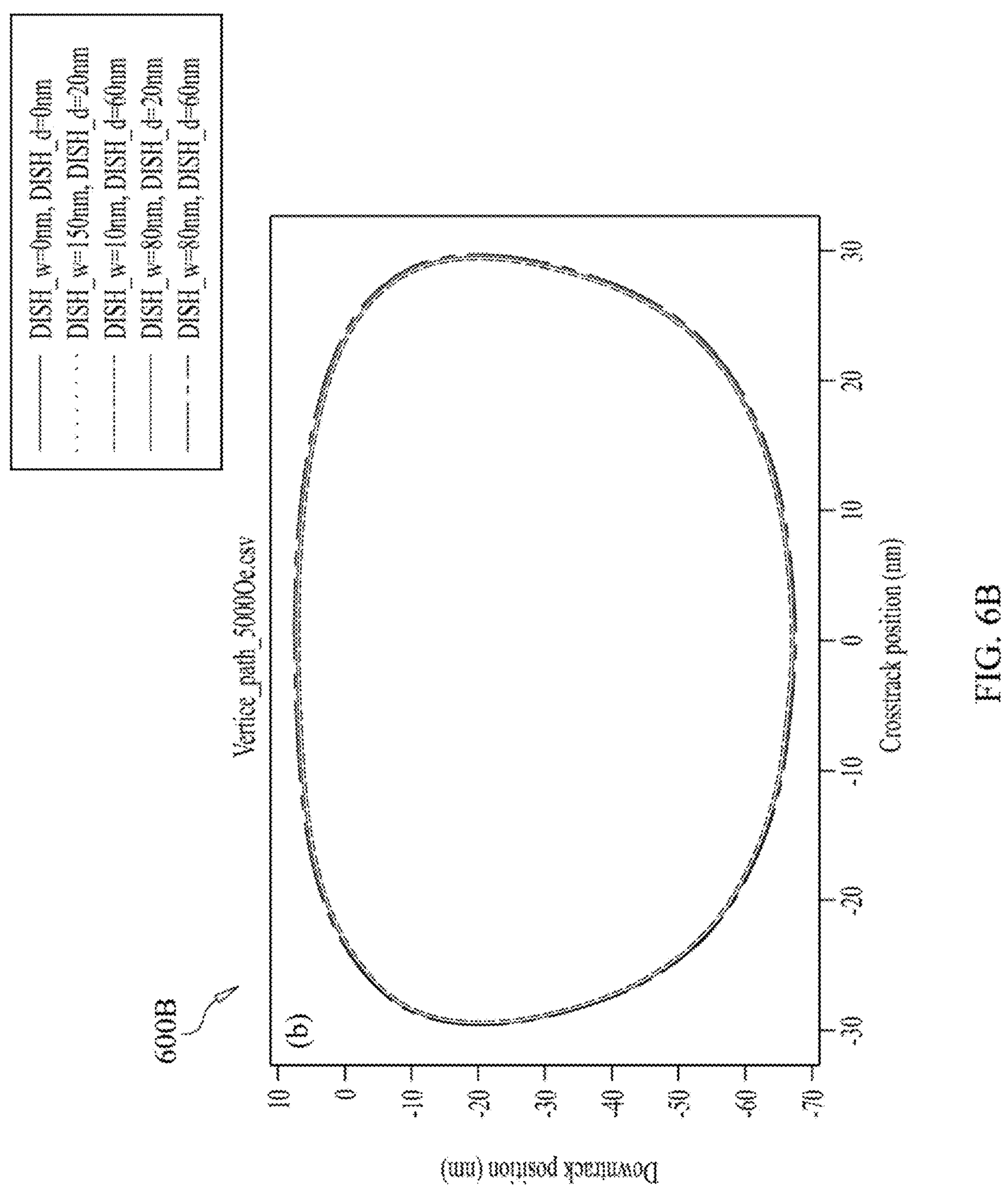
Figure 6C:
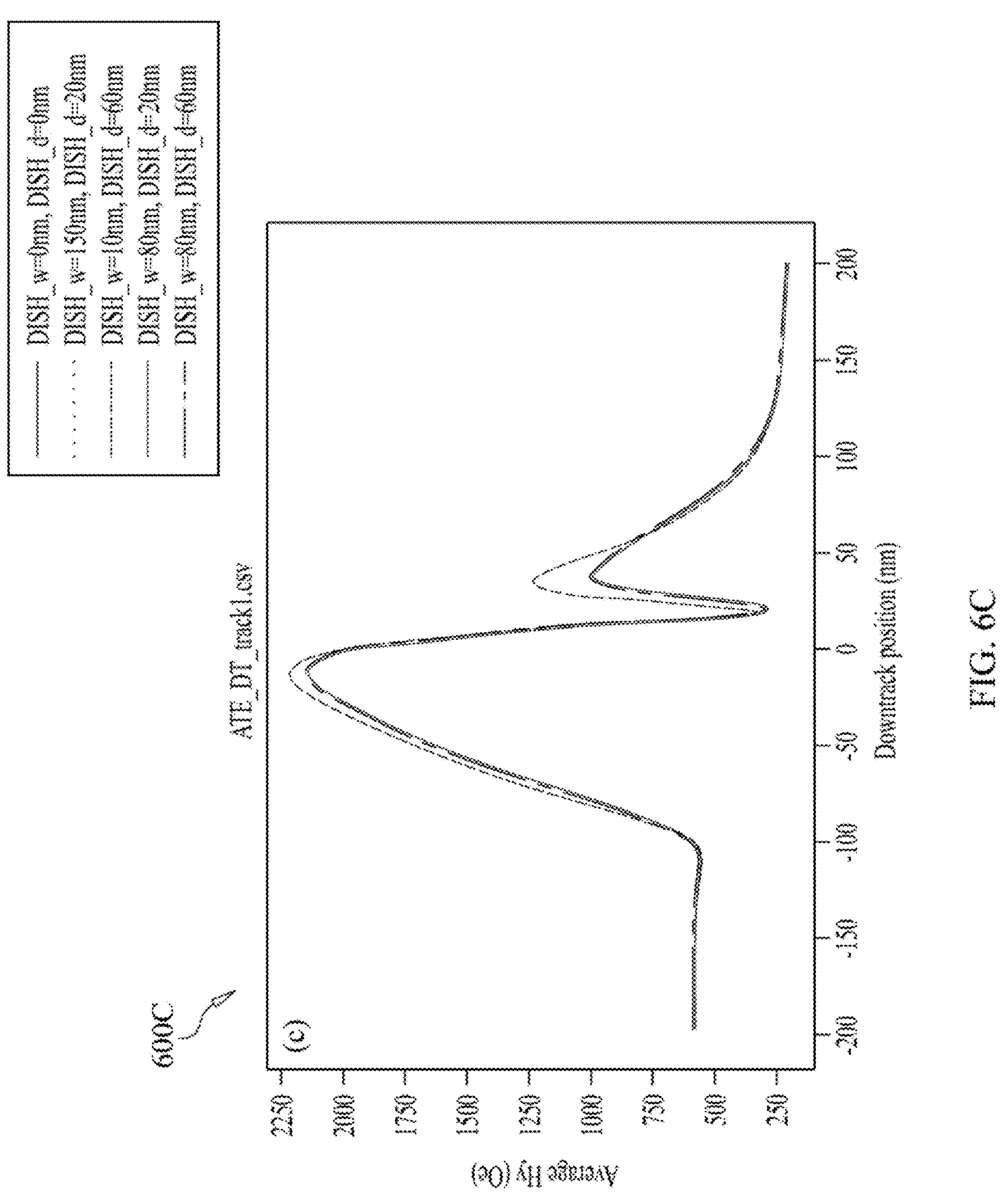
Figure 6D:
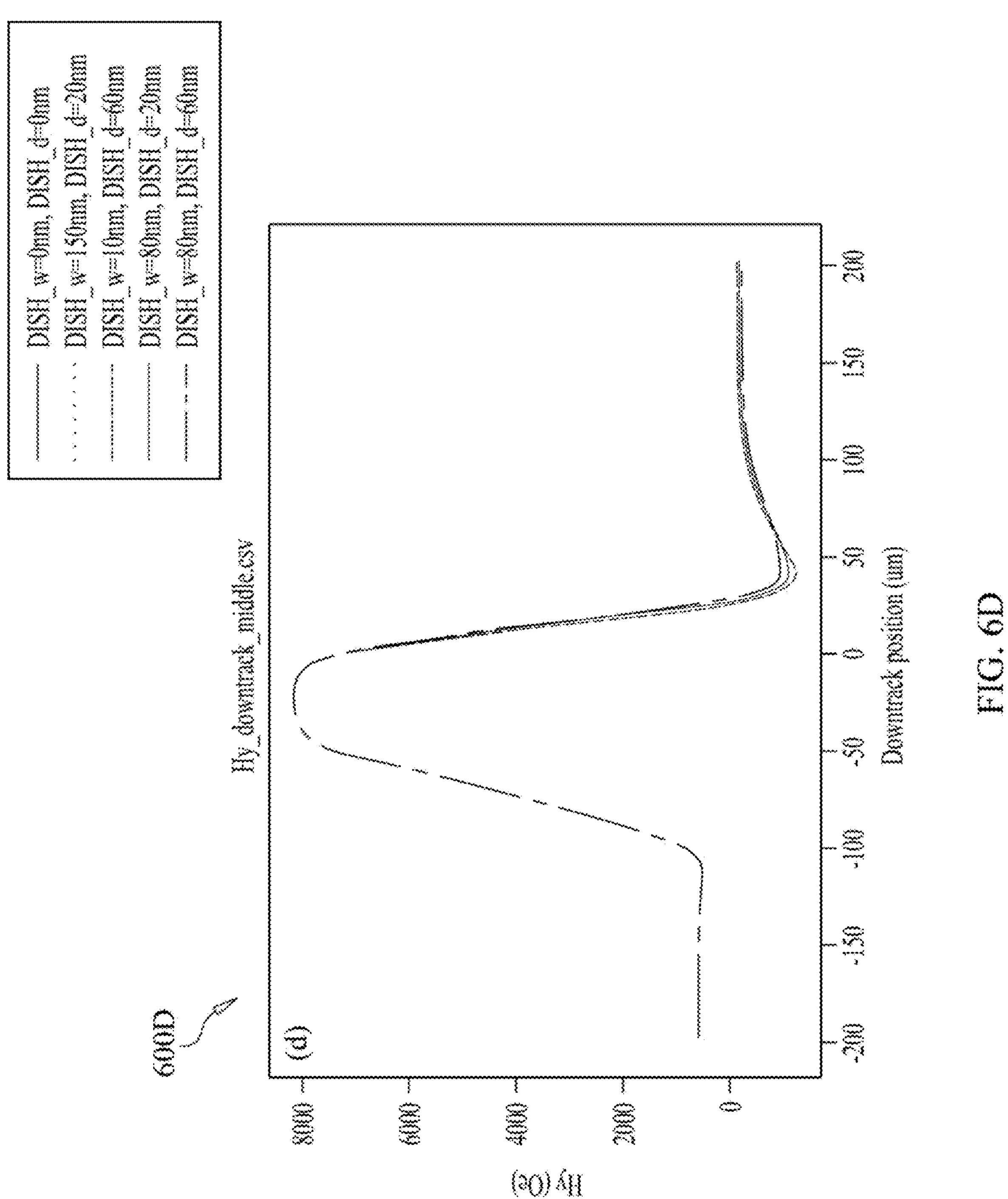

FIG. 6A illustrates a magnetic field profile colormap 600A obtained from static modeling, acquired at 15 nm below the ABS plane. FIG. 6B illustrates contour plots 600B, FIG. 6C illustrates a downtrack ATE profile 600C, and FIG. 6D illustrates a downtrack Hy profile 600D at adjacent track for different etching parameters of the patterned HS designs.

In general, the magnetic media can have an averaged switching field around 5000 Oe. To compare the writing bubble difference in different patterned HS designs, the 5000 Oe contour lines can be plotted in FIG. 6B. The average writing bubble width can be maintained at approximately 58 nm, independent of the etching parameters. This can indicate that the patterned HS design has small impact on the erasure width since it can be mainly determined by the MP shape on the ABS. To evaluate the adjacent track interference, average Hy at the adjacent track as a function of the DT position for different etching condition can be plotted in FIG. 6C.

Since the adjacent track erasure (ATE) can be proportional to the Hy in HS region (0-100 nm DT position), it can provide a clue of how strong the interference from HS region. As compared to the unpatterned HS design, the narrower remaining HS and the deeper etching thickness, the weaker the average Hy in the adjacent tracks, which can effectively reduce the ATI from the HS region. Besides, the Hy as a function of DT position can be plotted in FIG. 6D. With etching deeper and narrower, a smaller return field can be observed, consistent with ATE reduction. The DT gradient, defined as the slope of the curve, can show similar level in different HS design, indicating no degradation in BPI, as it is usually proportional to the DT gradient. Besides, the maximum Hy in patterned HS design may show no difference compared to the current design, indicating no decay in writability.

In addition to the static modeling, dynamic simulations based on LLG can be also carried out on patterned HS designs. Compared to static modeling, the dynamic simulations can tell the response of writer head in the time domain at high frequency. Besides, the magnetic domains may be only simulated by multidomain LLG models due to the exchange interaction. FIGS. 6A-6D can list the simulated designs and their parameters. Design0001 can be the reference sample without any patterned HS, while Design0002/Design0003 can have patterned HS designs. The insect orange shape showing the schematic drawing of the design.

FIGS. 7A-7D illustrate example parameters in dynamic simulations. The probability map of writer field profile above 1000 Oe threshold and crosstrack averaged Hy profile 700A (in FIG. 7A) unpatterned HS design and (in FIG. 7B) patterned HS design 700B. The averaged Hy profile as a function of crosstrack position for at different threshold field (700C in FIG. 7C) 1000 Oe and (700D in FIG. 7D) 1500 Oe.

Figures 7A, 7B:
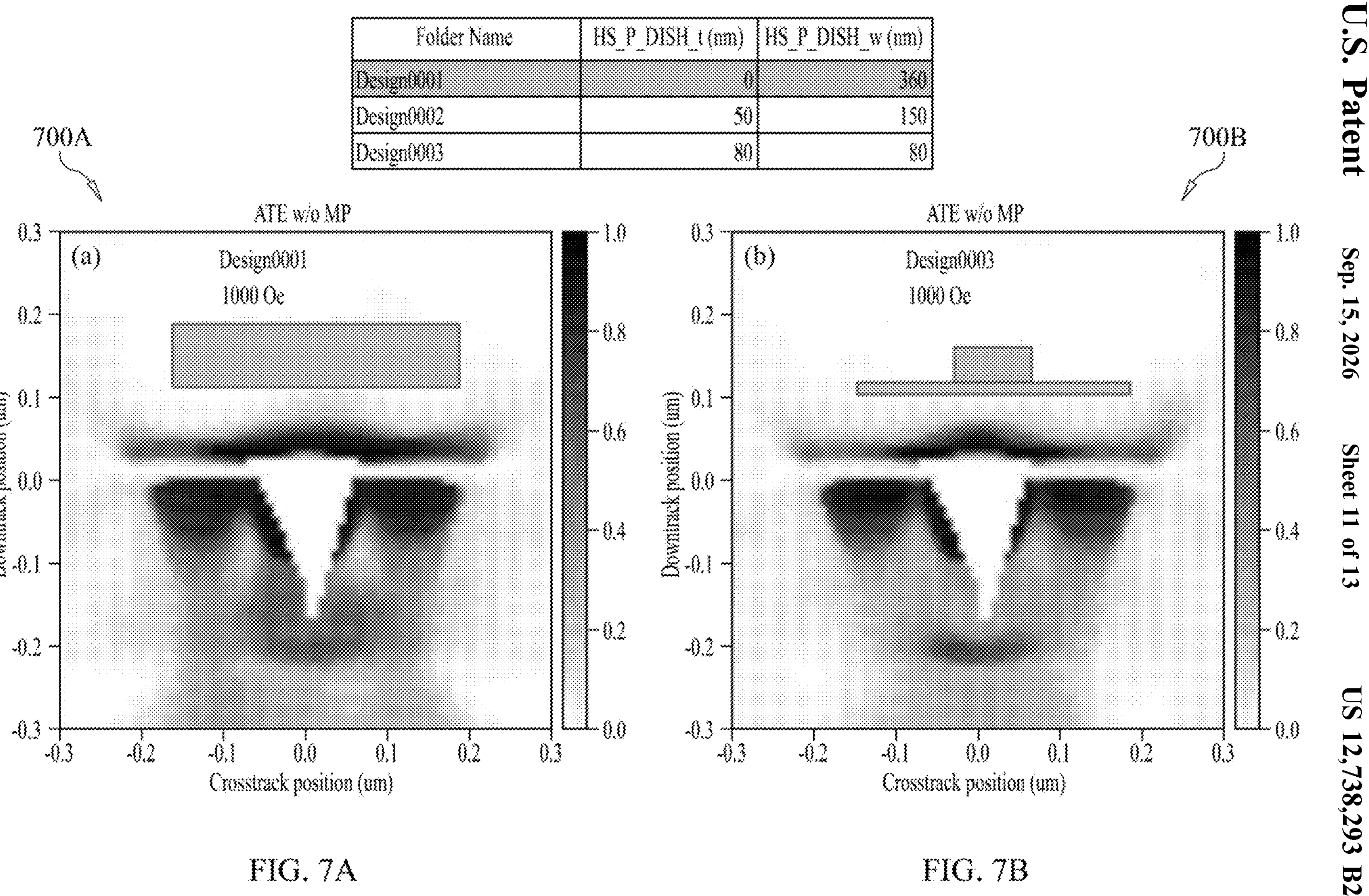
FIGS. 7A-7D illustrate example parameters in dynamic simulations according to an embodiment.
Figure 7C:
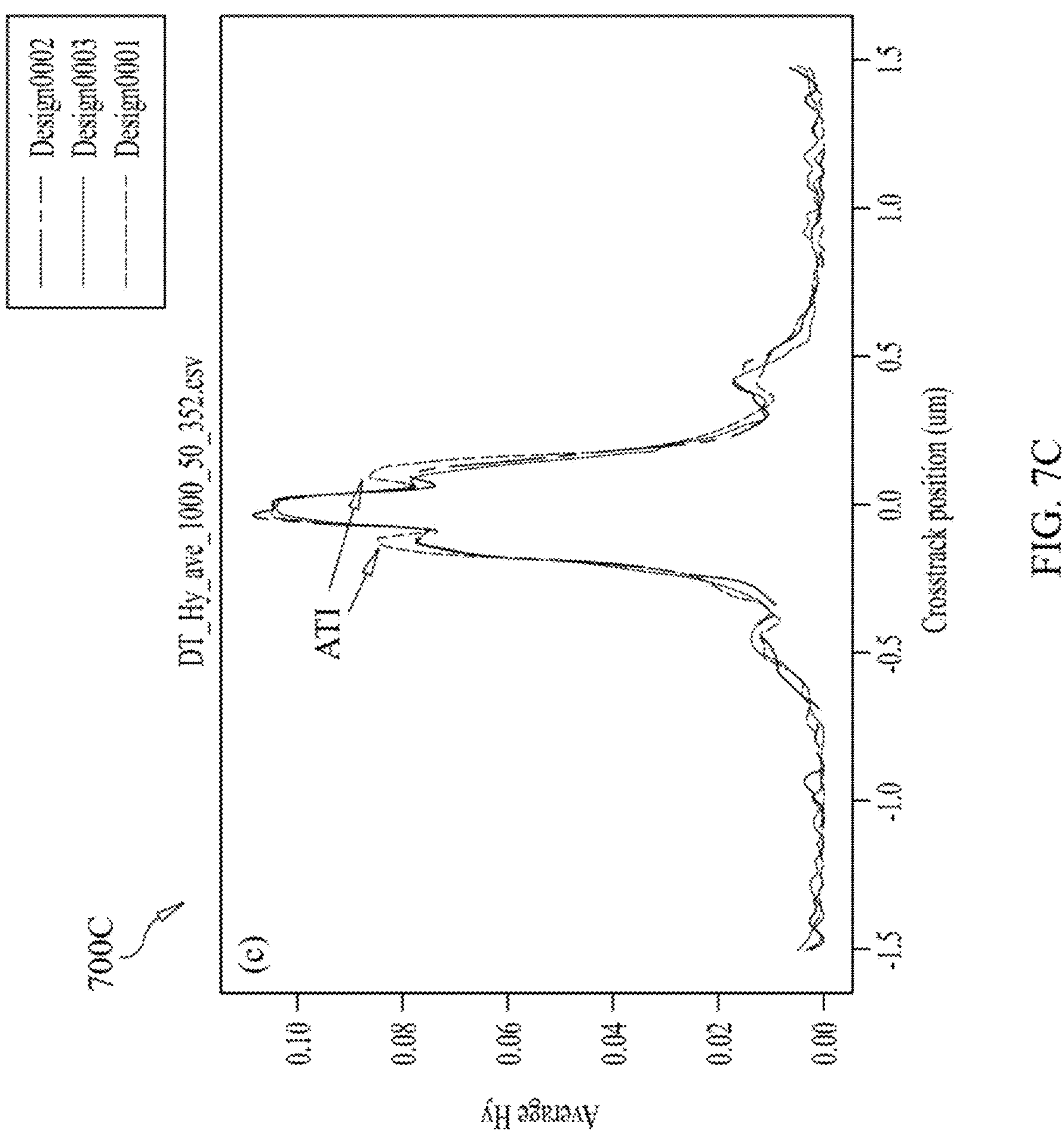
Figure 7D:
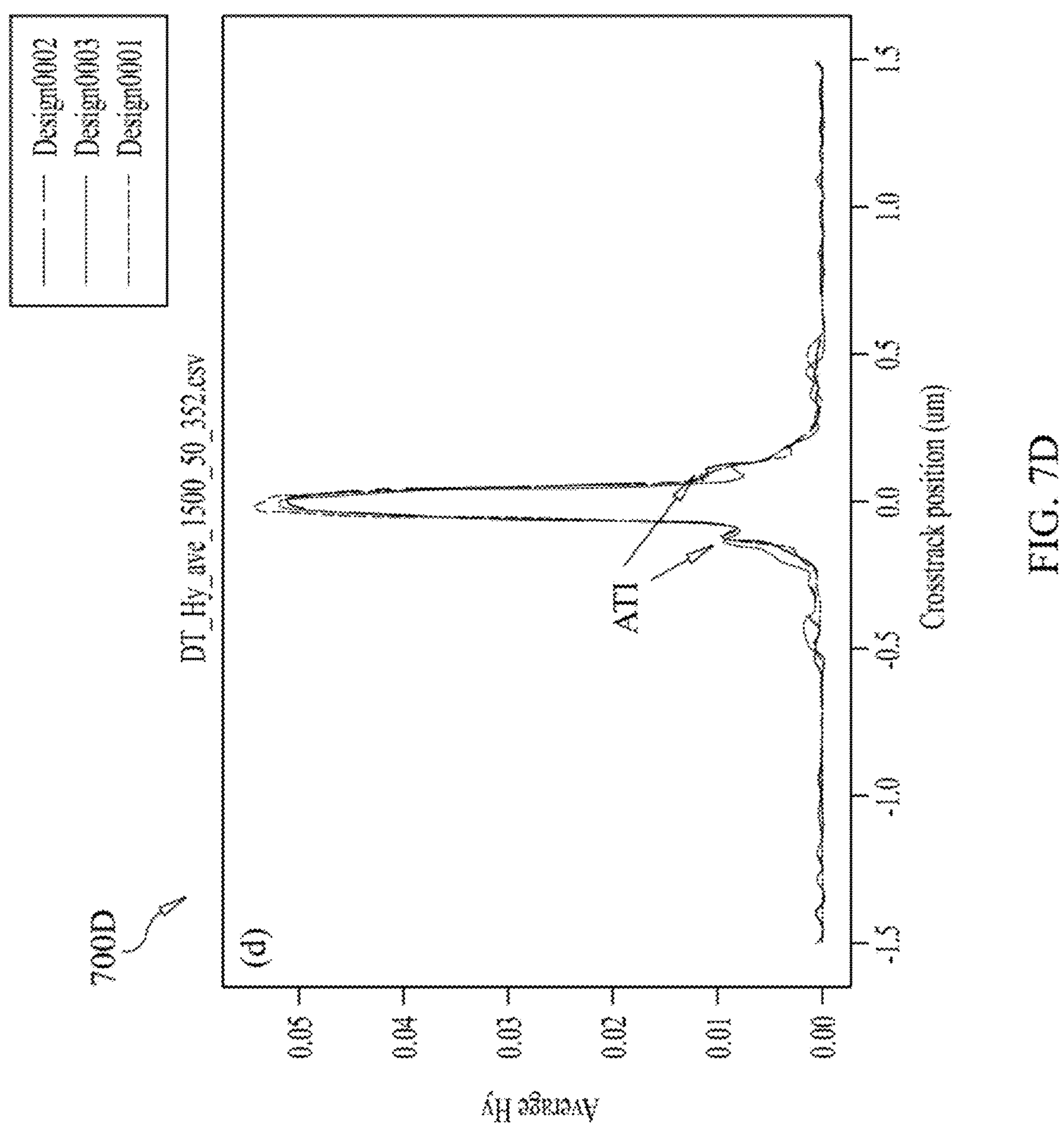

In FIGS. 7A-7B, the probability map of the head-generated field can be plotted that exceeds 1000 Oe threshold field. As the probability of the ATE and wide ATE (WATE) are proportional to the change of magnetic field that exceeds certain threshold, these probability map can be a good indication of the interference distribution of the writer head. Compared to the unpatterned HS design (Design0001 in FIG. 7A), patterned HS design (Design0003 in FIG. 7B) has much smaller dynamic ATE at the two sides of the HS. Crosstrack averaged Hy profiles at different threshold magnetic field are plotted in FIGS. 7C-7D (in plots 700C-D). It can be observed that patterned HS designs show a much smaller ATI at the adjacent tracks, due to the lower HS magetic volume near the ABS, consistent with the probability maps plotted for different HS design.

A difference between the patterned HS designs and other HS designs can be the shape of the magnetic materials at two sides of the HS. In the other designs, the HS is only patterned once and etched through the entire HS with a width around 400 nm. Compared to the other designs, the patterned HS designs as described herein can carry out a two-step process, which can add an additional step on top of the first original etching step. The following additional step can be based on a smaller photo mask and it will either partially or completely remove the HS materials at two sides in different shape design as shown in four different designs.

The present embodiments can provide magnetic writer head designs with a patterned hot seed (HS), applicable for PMR, MAMR and other magnetic recording head of similar structure, used in hard disk drives.

In a first example, as shown in FIG. 1A, a baseline non-dual-write-shield (nDWS)-based write head structure can include a main pole (MP) that provides a strong and concentrated magnetic flux to write the medium bit, a trailing shield (TS) that collects back the magnetic flux, a write gap (WG) between the MP and the TS. The WG can be composed of non-magnetic materials, but in some designs, an additional magnetic element can be implemented near the MP. The structure can also include a side shield (SS), a leading shield (LS), and a write shield (WS) that prevents magnetic flux from reaching the medium bits away from the MP tip, and a side gap (SG) between the MP and the SS on both sides of the MP tip, typically composed of non-magnetic materials. The structure can also include a leading gap (LG) between the MP and the LS, typically composed of the same material and has the same dimension as the SG, and a coil is wrapping around the MP through a PP3 shield that takes a time-dependent write current to saturate MP magnetization.

In some instances, the structure can include a hot seed (HS), which can be made of high saturation magnetization materials, and can be deposited on top of WG and extended into the ABS plane with a flared shape.

In some instances, the HS can include an eTHd structure near the WG, with a discrete two-step cliff as shown in the cross-sectional view (e.g., as shown in FIG. 1B).

In some instances, the HS can be, but not limited to, 40-200 nm thick with uniformed thickness extended into the ABS. The HS wide can be ranged from, but not limited to, 50 to 400 nm wide at the ABS and expanded into the ABS, depends on the flare angle, which can be ranged from, but not limited to, 20 degrees to 50 degrees.

In some instances, the patterned HS design is based on the HS, with additional patterning process, fabricated by etching or deposition process but not limited to these processes, to create a step-shaped HS.

In some instances, the patterned HS can be also extended to multiple steps patterned HS, which can be fabricated by adding more additional patterning steps on top of each layer of HS.

In some instances, the patterned HS can have two sides etched away with an etching depth HS_P_DISH_t ranged from, but not limited to, 0 nm to 100 nm or being completed etched through. The remaining unpatterned center region of HS can remain the same thickness and its width can be ranged from, but not limited to, 50 nm to 400 nm (e.g., as shown in FIGS. 2-5).

In some instances, the unpatterned center region in claim can extend straight into the ABS (FIG. 2A) or following the flare angle of the original HS (FIG. 4A), but not limited to these two angles. The extended part can have a flare angle ranged from, but not limited to, 0 degree (straight) to 70 degree.

In some instances, the patterned HS can also form a structure with all HS materials removed near the ABS plane as shown in FIG. 3B. In this case, the etching distance from the ABS plane, defined as HS_P_DISH_d, can be ranged from, but not limited to, 0 nm to 300 nm.

In some instances, a remaining extended center region that is away from the ABS plane can be either a smoothed curve in oval or circle shape or have a flare angle ranged from, but not limited to, 0 degree to 70 degree.

In some instances, the patterned HS can also have a narrower HS near the WG and wider HS on top of the narrower HS as shown in FIG. 5. This can be a reversed stack compared to previous mentioned patterned HS structure.

In some instances, the thickness of narrower HS region can range from, but not limited to, 0 to 100 nm, with a dishing angle HS_P_DISH_a ranged from 20 degree to 150 degree. The width can range from, but not limited to, 50 to 400 nm.

In a first example embodiment, a write head for a disk drive is provided. The write head can include a main pole (MP), a trailing shield (TS), and a write gap (WG) between the MP and TS. The write head can also include a hot seed (HS) deposited on top of the WG and extending into an air-bearing surface of the write head. The HS can be patterned to comprise one or more steps and a flared end disposed at a flared angle relative to the ABS.

In some instances, the HS is patterned to include a discrete two-step cliff design that includes two steps etched between a central portion, wherein the steps are etched to an etching depth.

In some instances, a thickness of the HS is between 40-200 nanometers (nm) and a width of the HS is between 50-400 nm, and wherein the flared angle is between 20-50 degrees relative to the ABS.

In some instances, the HS is patterned using an etching process or between a multiple step process including performing multiple etching steps on top of each layer of the HS.

In some instances, the etching depth is between 1 nm to 100 nm, and wherein a width of the center portion is between 50 nm to 400 nm.

In some instances, the center portion extends to the ABS, and wherein the center portion comprises an angle between 0 degrees to 70 degrees relative to the ABS. In some instances, part of the center portion adjacent to the ABS is etched, wherein the etching distance of the part of the center portion is between 1 nm and 300 nm. In some instances, a remaining part of the centered portion is a curve in an oval or circular shape, or includes a flared angle ranging from 0 degrees to 70 degrees.

In some instances, wherein the HS includes a first part and a second part, wherein a first part is disposed adjacent to the WG and is narrower than the second part. Further, a dishing angle can be formed between the first part and second part with the dishing angle being between 20 degrees and 150 degrees, and wherein a thickness of the first part is between 1 nm to 100 nm.

In another example embodiment, a device provided. The device can include a main pole (MP) configured to concentrate a magnetic flux, a trailing shield (TS), and a write gap (WG) between the MP and TS, the WG comprising a non-magnetic material. The device can also include a side shield, leading shield, and a write shield disposed adjacent to the MP and configured to prevent magnetic flux from reaching areas outside of a desired area. The device can also include a hot seed (HS) deposited on the WG and extending into an air-bearing surface of the write head. The HS can be patterned to comprise one or more steps and a flared end disposed at a flared angle relative to the ABS.

In some instances, the HS is patterned to include a discrete two-step cliff design that includes two steps etched between a central portion, wherein the steps are etched to an etching depth.

In some instances, a thickness of the HS is between 40-200 nanometers (nm) and a width of the HS is between 50-400 nm, and wherein the flared angle is between 20-50 degrees relative to the ABS.

In some instances, the HS is patterned using an etching process or between a multiple step process including performing multiple etching steps on top of each layer of the HS.

In some instances, the etching depth is between 1 nm to 100 nm, and wherein a width of the center portion is between 50 nm to 400 nm.

In some instances, the center portion extends to the ABS, and wherein the center portion comprises an angle between 0 degrees to 70 degrees relative to the ABS. In some instances, part of the center portion adjacent to the ABS is etched, wherein the etching distance of the part of the center portion is between 1 nm and 300 nm. In some instances, a remaining part of the centered portion is a curve in an oval or circular shape, or includes a flared angle ranging from 0 degrees to 70 degrees.

In some instances, the HS includes a first part and a second part, wherein a first part is disposed adjacent to the WG and is narrower than the second part, wherein a dishing angle is formed between the first part and second part with the dishing angle being between 20 degrees and 150 degrees, and wherein a thickness of the first part is between 1 nm to 100 nm.

In another example embodiment, a write head is described. The write head can include a main pole (MP), a trailing shield (TS), a write gap (WG) between the MP and TS and a hot seed (HS) deposited on top of the WG and extending into an air-bearing surface of the write head. The HS can be patterned to include a discrete two-step cliff design that includes two steps etched between a central portion, wherein the steps are etched to an etching depth.

In some instances, the etching depth is between 1 nm to 100 nm, and wherein a width of the center portion is between 50 nm to 400 nm.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A write head for a disk drive, the write head comprising:

a main pole (MP);

a trailing shield (TS);

a write gap (WG) between the MP and TS; and a hot seed (HS) deposited on top of the WG and extending into an air-bearing surface (ABS) of the write head, wherein the HS comprises a top portion and one or more steps and a flared end with a pair of opposing sides of the HS disposed in parallel with one another at a flared angle relative to the ABS such that a thickness of the flared end is substantially uniform along the flared end, the top portion being disposed between the opposing sides of the flared end in a cross track direction, perpendicular to a direction extending between the MP and the TS, and wherein the top portion of the HS comprises a central portion that comprises a rectangular shape with sides that are disposed perpendicular to the ABS and a thickness that extends to a top of the HS, and etched side portions each disposed adjacent to the central portion and comprising a thickness less than that of the central portion.

2. The write head of claim 1, wherein the HS comprises two discrete steps etched in the HS that are etched to an etching depth.

3. The write head of claim 2, wherein the etching depth is between 1 nm to 100 nm, and wherein a width of the central portion is between 50 nm to 400 nm.

4. The write head of claim 3, wherein the central portion extends to the ABS, and wherein the central portion comprises an angle between 0 degrees to 70 degrees relative to the ABS.

5. The write head of claim 3, wherein part of the central portion adjacent to the ABS is etched, wherein the etching depth of the part of the central portion is between 1 nm and 300 nm.

6. The write head of claim 5, wherein a remaining part of the central portion is a curve in an oval or circular shape, or includes a flared angle ranging from 0 degrees to 70 degrees.

7. The write head of claim 1, wherein a thickness of the HS is between 40-200 nanometers (nm) and a width of the HS is between 50-400 nm, and wherein the flared angle is between 20-50 degrees relative to the ABS.

8. The write head of claim 1, wherein the HS is patterned using an etching process or between a multiple step process including performing multiple etching steps on top of each layer of the HS.

9. The write head of claim 1, wherein the HS includes a first part and a second part, wherein a first part is disposed adjacent to the WG and is narrower than the second part, wherein a dishing angle is formed between the first part and second part with the dishing angle being between 20 degrees and 150 degrees, and wherein a thickness of the first part is between 1 nm to 100 nm.

10. The write head of claim 1, wherein a width of the central portion is between 50 nm to 400 nm.

11. A device comprising:

a main pole (MP) configured to concentrate a magnetic flux;

a trailing shield (TS);

a write gap (WG) between the MP and TS, the WG comprising a non-magnetic material;

a side shield and a leading shield disposed adjacent to the MP and configured to prevent magnetic flux from reaching areas outside of a desired area; and a hot seed (HS) deposited on the WG and extending into an air-bearing surface (ABS), wherein the HS comprises a top portion and one or more steps and a flared end with a pair of opposing sides of the HS disposed in parallel with one another at a flared angle relative to the ABS such that a thickness of the flared end is substantially uniform along the flared end, the top portion being disposed between the opposing sides of the flared end in a cross track direction, perpendicular to a direction extending between the MP and the TS, and wherein the top portion of the HS comprises a central portion that comprises a rectangular shape with sides that are disposed perpendicular to the ABS and a thickness that extends to a top of the HS, and etched side portions each disposed adjacent to the central portion and comprising a thickness less than that of the central portion.

12. The device of claim 11, wherein the HS comprises two discrete steps etched in the HS that are etched to an etching depth.

13. The device of claim 12, wherein the etching depth is between 1 nm to 100 nm, and wherein a width of the central portion is between 50 nm to 400 nm.

14. The device of claim 13, wherein the central portion extends to the ABS, and wherein the central portion comprises an angle between 0 degrees to 70 degrees relative to the ABS.

15. The device of claim 13, wherein part of the central portion adjacent to the ABS is etched, wherein the etching depth of the part of the central portion is between 1 nm and 300 nm.

16. The device of claim 15, wherein a remaining part of the central portion is a curve in an oval or circular shape, or includes a flared angle ranging from 0 degrees to 70 degrees.

17. The device of claim 11, wherein a thickness of the HS is between 40-200 nanometers (nm) and a width of the HS is between 50-400 nm, and wherein the flared angle is between 20-50 degrees relative to the ABS.

18. The device of claim 11, wherein the HS is patterned using an etching process or between a multiple step process including performing multiple etching steps on top of each layer of the HS.

19. The device of claim 11, wherein the HS includes a first part and a second part, wherein a first part is disposed adjacent to the WG and is narrower than the second part, wherein a dishing angle is formed between the first part and second part with the dishing angle being between 20 degrees and 150 degrees, and wherein a thickness of the first part is between 1 nm to 100 nm.

* * * * *